May 12, 1931.  W. MEACHER  1,804,537
MACHINE FOR REMOVING THE SURFACE SCALE FROM METAL PLATES
Filed Sept. 15, 1928

INVENTOR
W. MEACHER
BY
ATTORNEY

UNITED STATES PATENT OFFICE

WYATT MEACHER, OF LONDON, ENGLAND

MACHINE FOR REMOVING THE SURFACE SCALE FROM METAL PLATES

Application filed September 15, 1928, Serial No. 306,198, and in Great Britain September 23, 1927.

This invention relates to machines for removing the surface scale from metal plates and has for its object to provide an improved form of machine which is particularly suitable for preparation of the edges of thin metal plates for welding operations though not restricted to this use.

Attempts have been made to build grinding machines for this purpose and in one machine it was proposed to feed the edges of plates between grinding wheels by means of upper and lower driven feed rollers arranged on each side of the grinding wheels. The feed rollers and grinding wheels were mounted on heads transversely adjustable on the machine bed to deal with different widths of plate.

The object of the present invention is to provide a plate grinding machine in which the plates are clamped with their edges projecting, and these projecting edges are ground on the upper and lower surfaces by grinding wheels which are independently driven and are maintained in floating condition so that they may follow slight variations in the contour of the plate without alteration in the pass between the wheels. Another object is to provide a machine in which the grinding wheels are preferably independently driven and are preferably carried on pivoted arms and maintained in floating condition by means of springs, the floating movement preferably being limited by means of stops.

With these and other objects in view, the invention consists in the novel arrangements set out in the claiming clauses at the end of this specification.

The improved machine in its preferred form comprises opposed upper and lower power driven grinding wheels, means for clamping a plate in flat condition with its edge projecting and means for causing the plate to move relatively and tangentially to the grinding wheels.

Figure 1:
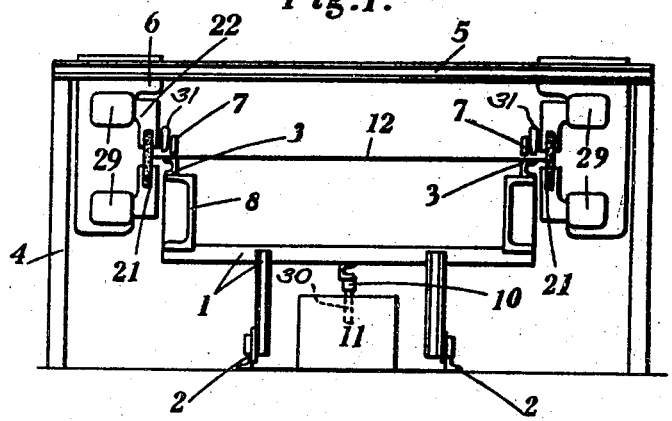
Figure 2:
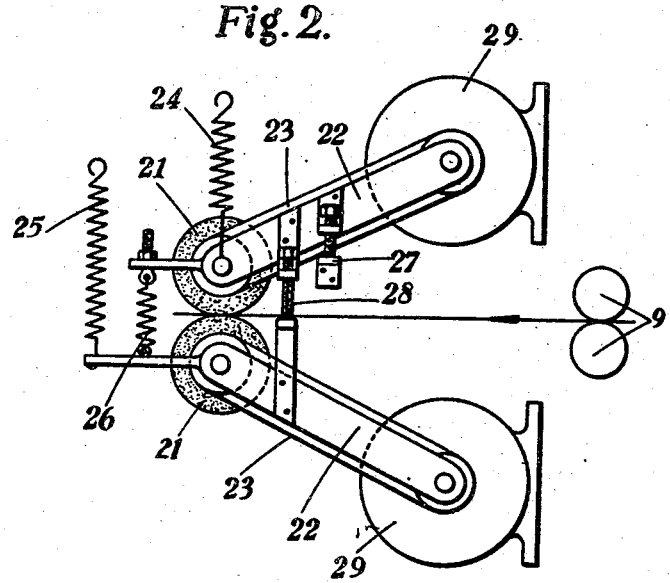

In the accompanying drawings, which illustrate a preferred embodiment of the invention in a diagrammatic manner, Fig. 1 represents an end elevation of the complete machine, Fig. 2 represents to enlarged scale a detail view of the grinding wheels with their driving and supporting means. The apparatus comprises a movable supporting framework (1) (Fig. 1) carried on rails (2) with a rack (10) operated by a pinion 30 from a fixed mechanism (11) in a convenient position under the movable framework and between the track rails.

The driving mechanism consists preferably of an electric motor and speed reduction gear of variable ratio with belt driven step cone pulleys with a chain drive to the pinion the driving sprocket being centered about the pivot of the moving arm. This inclined arm is raised into mesh with the rack through a pedal operating through a spring so as the more gently to mesh the pinion with the rack when the framework is first put into motion.

The movable framework (1) on the upper surface is provided with longitudinal channel irons (3) carried on brackets (8) secured so that the distance between same can be varied to suit metal plates (12) of variable width.

Clamping bars (7) are provided operated by cams and levers to quickly clamp down the plates to the longitudinal channel irons so as to straighten the projecting edge of the plate which passes between the grinding wheels. The plates are thus supported along their entire length and each portion of a plate as it is being ground is supported opposite its point of engagement with the grinding wheels. Outside the movable framework two fixed stanchions (4) carry an overhead member (5) on which a bracket (6) on either side supports the power driven grinding wheels, these brackets being capable of transverse adjustment to suit the width of the plate the surface edges of which it is desired to grind.

Each bracket carries two grinding wheels (21) (Fig. 2) preferably running on ball bearings totally enclosed to exclude emery dust, one wheel being below and one above the surface edge to be ground, the rotation being such as to impel the grinding dust away from the power mechanism. These grinding wheels are carried on pivoted arms (22) and each arm is preferably supported from a separate motor (29) and driven by belt (23) or chain, the centre of drive being in alignment with the pivots of the arms (22).

The necessary uniform grinding pressure is applied—(*i*) by means of adjustable tension springs to each arm with adjustable fixed stops to keep the grinding faces on a level with the plate and also to prevent the faces of the wheels coming together so causing undue wear of same, the stops at the same time offering no impediment to the wheels being opened apart.

(*ii*) Alternatively each arm may be balanced as shown in the drawings by springs (24 and 25) so that each is virtually floating and a further adjustable tension spring (26) fitted between the pivoted arms (22) applies the desired grinding pressure to each wheel, an adjustable screw engaging against a fixed stop (27) locating the grinding faces preferably slightly below the level of the plate to be ground, and an adjustable stop (28) carried on the pivoted arms preventing the grinding faces from touching one another.

Method (*i*) is applicable to thick plates, which are set with a small overhang beyond the clamping bar of the movable framework.

Method (*ii*) is chiefly applicable to thin plates set with more overhang so that the faces of the grinding wheels follow more closely any irregularity in the surface edge of the plate.

To smooth out this as much as possible a narrow edge of the plate is first introduced between two pressure rollers (9) carried on ball or roller bearings and securely fixed to each of the brackets. The pivots to these rollers are supported in a framework controlled by thrust and tension screws easily adjustable to keep each surface of the roller parallel and at the same time to give the necessary clearance to pass the edge of the plate to be ground, the elasticity of this framework being sufficient to accommodate a considerable discrepancy in the thickness of these plates.

With the above arrangement it is possible to remove the scale on all four faces (that is the two surfaces of two edges of a plate) simultaneously so that without further preparation the plate can be electrically welded by the contact process.

I claim—

1. In a machine for grinding simultaneously the upper and lower surfaces of metal plates adjacent the edges thereof, the combination of independently driven grinding wheels engaging the plates on opposite sides thereof, means for clamping the plates opposite the point of engagement of the grinding wheels with the plates, means for moving the plates relatively to the grinding wheels and tangentially thereto, pivoted arms carrying said grinding wheels and spring means for maintaining said pivoted arms in floating condition.

2. In a machine for grinding simultaneously the upper and lower surfaces of metal plates adjacent the edges thereof, the combination of independently driven grinding wheels engaging the plates on opposite sides thereof, means for clamping the plates opposite the point of engagement of the grinding wheels with the plates, means for moving the plates relatively to the grinding wheels and tangentially thereto, pivoted arms carrying said grinding wheels, spring means for maintaining said pivoted arms in floating condition, and stops for limiting the floating movement of said pivoted arms.

3. In a machine for grinding simultaneously the upper and lower surfaces of metal plates adjacent the edges thereof, the combination of independently driven grinding wheels engaging the plates on opposite sides thereof, means for clamping the plates opposite the point of engagement of the grinding wheels with the plates, means for moving the plates relatively to the grinding wheels and tangentially thereto, and upper support, and a transversely adjustable bracket supported from said upper support and carrying said grinding wheels in floating condition under spring control.

4. A machine for grinding simultaneously the upper and lower surfaces of metal plates adjacent the edges thereof characterized in that the plate is clamped on a moving table with the edges projecting and that the two projecting edges are ground simultaneously by upper and lower wheels which are mounted at the ends of oscillating arms and maintained in a floating condition under spring pressure regulated by stops.

5. In a machine for grinding simultaneously the upper and lower surfaces of metal plates adjacent the edges thereof, the combination of opposed upper and lower power driven grinding wheels, means for clamping a plate in flat condition with its edges projecting, means for causing the plate to move relatively to the grinding wheels, independent driving means for the grinding wheels, and floating mounting for said wheels permitting variation in height of the pass without variation of the width of the pass.

6. In a machine for grinding simultaneously the upper and lower surfaces of metal plates adjacent the edges thereof, the combination of independently driven grinding wheels engaging the plates on opposite sides thereof, means for clamping the plates opposite the point of engagement of the grinding wheels with the plates, means for moving the plates relatively to the grinding wheels and tangentially thereto, pivoted arms carrying said grinding wheels, an electric motor driving each said grinding wheel, the axis of each of said motors being collinear with the pivot of each arm, and gearing transmitting the rotation of the motors to the respective wheels.

7. A machine for grinding simultaneously the upper and lower surfaces of metal plates adjacent the edges thereof comprising in combination a supporting framework, of width less than the width of the plates to be ground, means arranged at each side of said framework for clamping the plates to said framework along lines parallel to the surfaces to be ground, with both edges of the plate projecting, upper and lower grinding wheels engaging each plate near the edge thereof on upper and lower surfaces, and means for traversing said framework to move the work through the grinding wheels.

In testimony whereof I affix my signature.

WYATT MEACHER.